United States Patent Office 2,842,479
Patented July 8, 1958

2,842,479

N-HIGHER ALIPHATIC ACYL ALPHA-AMINO ARYL ACETIC ACIDS AND COMPOSITIONS THEREWITH

Eric Jungermann, Fort Lee, N. J., assignor to Colgate-Palmolive Company, Jersey City, N. J., a corporation of Delaware No Drawing. Application May 24, 1955
Serial No. 510,839

9 Claims. (Cl. 167—65)

The present invention relates to novel acylated aromatic amino acid compounds, more particularly to N-higher aliphatic acyl alpha-amino aryl acetic acid compounds, and to compositions containing the same.

The synthetic aromatic amino acids are a special class of compounds. Among the known synthetic amino acids are paraamino phenylacetic acid and p-aminobenzoic acid. In general, it has been proposed broadly to acylate amino acid compounds. Many important variations in properties of acylated derivatives of synthetic aromatic amino acids may be produced by varying the nature of the aromatic amino acid portion of the molecule.

Broadly, the present invention relates to the N-higher aliphatic acyl alpha-amino aryl acetic acid compounds. An embodiment relates to compounds represented by the formula:

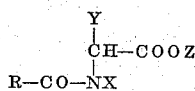

wherein R—CO— is a higher fatty acyl radical, X is selected from the group consisting of hydrogen and lower alkyl, Y is an aryl nucleus directly connected to the alpha-carbon atom, preferably phenyl, and Z is selected from the group consisting of hydrogen and water-soluble salt-forming cations. These novel compounds possess certain highly desirable anti-microbiological, particularly anti-bacterial, characteristics which are not possessed by the corresponding acylated derivatives of other synthetic aromatic amino acids.

Suitable examples of compounds within the scope of the present invention are N-lauroyl alpha-amino phenylacetic acid and its sodium, potassium, ammonium, mono- and tri-ethanolamine salts; sodium and potassium N-coconut fatty acyl alpha amino phenylacetate; ethanolamine N-myristoyl alpha amino phenylacetate; sodium N-palmitoyl alpha amino phenylacetate; sodium N-lauroyl alpha amino tolylacetate; sodium N-oleyl alpha amino phenylacetate; potassium N-stearoyl alpha amino phenylacetate; sodium N-methyl N-lauroyl alpha-amino phenylacetate; and the like. The compounds having a substantially saturated fatty acyl group of about 12 to 16 carbon atoms are preferred since they possess particularly beneficial properties.

Other novel salts are alkaline earth metal and heavy metal salts such as the corresponding calcium, magnesium, copper and zinc salts of the compounds referred to above, e. g. calcium, magnesium, copper and zinc salts of N-lauroyl alpha amino phenylacetate. These salts may be formed by reacting the acylated alpha amino aromatic acid or its alkali metal salt with the appropriate base, e. g. calcium or magnesium hydroxide.

The novel compounds of the present invention may be prepared in good yield and high purity by reacting the higher fatty acyl halide with the amino acid in an alkaline medium to form the corresponding N-higher aliphatic acyl amino acid salt.

The aliphatic acid halide used as a reactant may be derived from the higher fatty acids and the like in known manner. These higher fatty acid halides have about 8 to 22 carbon atoms generally, and preferably about 12 to 16 carbon atoms. It is preferred to use the acid chloride, though other halides such as the acid bromides may be employed also. Examples thereof are the acid chlorides and bromides of caproic, lauric, myristic, palmitic, stearic, oleic, linoleic acids and the like. These substances may be used alone or in any desired mixture thereof such as the higher fatty acid mixtures derived from various oils and fats, e. g. coconut oil, palm kernel oil, palm oil, cottonseed oil, tallow, and their hydrogenated derivatives.

As indicated the amino acid to be condensed therewith is alpha amino aryl acetic acid having a replaceable hydrogen atom directly attached to the nitrogen. The term "aryl" has reference to an aromatic nucleus which is directly connected to the alpha carbon atom of the acetic acid chain. The aryl group is preferably mononuclear such as those derived from the benzene series. The amino group may be unsubstituted such as in alpha amino phenylacetic acid or may have an inert substituent thereon such as a lower alkyl group, e. g. N-methyl amino phenylacetic acid, or an aryl group, e. g. N-phenyl amino phenylacetic acids.

This condensation reaction may be performed under varying conditions. The reaction may be conducted by mixing suitable proportions of the reactants in an aqueous alkaline medium. In general, the reaction may be effected using substantially stoichiometric ratios of the reactants. Generally, no external heat need be applied though the reaction mixture may be cooled below room temperature or subjected to elevated temperatures up to the refluxing temperature of the reaction mixture if desired. The presence of a suitable alkaline substance acts as an acceptor for the hydrogen halide which is liberated by the condensation reaction and thereby facilitates the completion of reaction. Any suitable alkaline neutralizing agent may be employed such as an alkali metal hydroxide, e. g. sodium and potassium hydroxide, as well as organic bases including amines, e. g. pyridine.

The product from the condensation reaction is the salt of the acylated alpha amino aryl acetic acid. This product may be purified in any suitable manner. It may be acidified to convert the salt to free acylated amino acid which separates from the reaction mixture and may be withdrawn in any suitable manner, such as by decantation or solvent extraction. It may be further purified by washing, solvent extraction, crystallization and the like. This acylated amino acid may be treated with an appropriate alkaline material to form any desired salt. Thus, it may be treated with an aqueous solution of sodium or potassium hydroxide which will form the corresponding salt with the acylated amino acid.

Among the unusual properties of these compounds is their antibacterial power on the oral flora (the complex mixture of micro-organisms normally present in the mouth), and particularly against oral lactobacilli. For example, sodium N-lauroyl alpha-amino phenyl acetate exhibits a superior bacteriostatic effect on lactobacilli and markedly inhibits the production of acid from fermentable carbohydrates by the micro-organisms found in saliva. As indicative of the specificity of action with respect to the chemical structure of these novel compounds, it has been found that corresponding derivatives of other synthetic aromatic amino acids such as sodium N-lauroyl para-amino phenylacetate does not exhibit equivalent activity, but is markedly inferior in antibacterial activity.

The substantially saturated N-higher fatty acyl derivatives of the alpha-amino phenylacetic acid, particularly those having about 12 to 16 carbon atoms in the fatty acyl group, exhibit also the unusual properties of being adsorbed by proteinaceous material and released so as to exert their anti-bacterial power. By reason of such properties, these derivatives have prolonged anti-bacterial activity in such applications where adsorption upon proteins is possible. It has been found that the water-soluble salts of the indicated compounds exhibit a superior anti-bacterial power against oral bacteria even after such materials have been adsorbed upon protein. For example, the sodium N-lauroyl alpha-amino phenylacetate shows a high degree of anti-bacterial activity after adsorption upon casein whereas the corresponding derivatives of para-amino phenylacetic acid and para-amino benzoic acid are essentially ineffective by comparison.

The novel acylated alpha-amino aryl acetic acid compounds exhibit marked anti-bacterial or bacteriostatic power against other micro-organisms also. For example, such compounds have been found to markedly inhibit the growth of Staphylococcus aureus bacteria whereas the corresponding derivatives of other synthetic aromatic amino acids as indicated above do not exhibit such activity. Furthermore, the compounds of the present invention exhibit particular activity against the Pityrosporum ovale type of bacteria which is an additional feature of the present invention.

In addition, these novel compounds exhibit marked surface-active properties rendering them further useful in many other specific types of products also. The long-chain fatty acyl group is primarily hydrophobic in character, whereas the free carboxyl or salt group of the amino acid is a more hydrophylic group. It is possible therefore to select the specific length of acyl chain, e. g. 10 to 18 carbons, and hydrophylic group, e. g. type of salt, such that the resulting compound may show affinities toward aqueous and/or fatty oily matters. Accordingly, it is possible to produce compounds of desired surface activity to fit the requirements for a particular use or class of uses. They may be used in various applications as detergent, wetting, foaming and emulsifying agents and the like.

Various products in which these novel compounds may be utilized, particularly for anti-bacterial effect but for surface activity also are cosmetic and detergent compositions and the like. Such preparations include ointments, lotions, skin creams, jellies, shampoos, hair dressings, hair rinses, shaving creams, detergent bars or cakes, cleansing and laundering compositions.

It is an embodiment of the present invention that these novel compounds may be utilized in preparations designed for application in the mouth. There may be prepared suitable tooth powders, toothpastes, liquid dentifrices, mouth washes or rinses, chewing gum, tablets, lozenges and the like. Any suitable amount of these novel compounds may be incorporated in the dental preparations. The specific amount will vary, naturally, depending upon the specific type of preparation but will generally be a minor amount, such as up to about 50% by weight. In the case of tooth powders and dental creams, these novel compounds will be up to about 10% and preferably up to about 5% by weight of the finished formulation generally.

Any suitable practically water-insoluble polishing agent may be admixed with these novel compounds in the preparation of dentifrice compositions of the present invention. There is a relatively large number of such materials known in the art. Representative materials include, for example, calcium carbonate, dicalcium phosphate (anhydrous or hydrated), tricalcium phosphate, calcium pyrophosphate, insoluble sodium metaphosphate, aluminum hydroxide, magnesium carbonate, calcium sulfate, bentonite, including suitable mixtures thereof.

In the preparation of tooth powders, it is usually sufficient to admix mechanically the various solid ingredients. In dental cream formulations, the liquids and solids should necessarily be proportioned to form a creamy mass of desired consistency which is extrudible from a collapsible tube. In general, the liquids in the dental cream will comprise chiefly water, glycerine, sorbitol or propylene glycol, including suitable mixtures thereof. It is usually advantageous to use a mixture of both water and a humectant or binder such as glycerine or sorbitol.

Other known materials may be incorporated in suitable amounts. A gelling agent such as the natural and synthetic gums and gum-like materials, e. g. Irish moss, gum tragacanth, sodium carboxymethylcellulose or starch may be added to the dental cream and the like in small amounts. Furthermore, such materials as soluble saccharin, flavoring oils, coloring or whitening agents, preservatives, alcohol and the like may be used as desired in proper amount.

As indicated mouth washes or rinses and the like are also within the scope of the present invention. Such products are usually an effective amount of the active ingredient dissolved or dispersed in a flavored liquid vehicle, preferably an aqueous alcoholic vehicle. Any suitable amount, such as up to five percent active ingredient may be used.

Other compositions will be formulated in known manner also.

The following examples are illustrative of the present invention and it will be understood that the invention is not limited thereto. All parts are by weight unless otherwise specified.

*Example I*

10 grams of lauroyl chloride is added with stirring to an aqueous solution of alpha amino phenylacetic acid (50% molar excess) maintained at a pH of 11–11.5 by the addition of sodium hydroxide. The reaction mixture is stirred until the pH of the solution remains constant, indicating the completion of the reaction. The solution is acidified with 30% sulfuric acid and extracted with ether. A small amount of dimethyl formamide is added as an additional solvent. The ether extract is washed with water to neutrality and then dried over anhydrous magnesium sulfate. Upon cooling, a solid material crystallizes from the ether solution which is identified as N-lauroyl alpha-amino phenylacetic acid having a neutral equivalent of 335 as analyzed and 333 as calculated, and a melting point of 113–114° C.

The N-lauroyl alpha-amino phenylacetic acid is dissolved in ethyl alcohol and neutralized with alcoholic sodium hydroxide. The solution is cooled and a white precipitate crystallizes from solution which is the sodium salt of N-lauroyl alpha-amino phenylacetic acid.

*Example II*

Alpha-amino phenyl acetic acid and palmitoyl chloride are reacted under the same conditions as in Example I resulting in the formation of N-palmitoyl alpha-amino phenylacetic acid as the intermediate product, and in the recovery of the corresponding sodium salt as the final product.

*Example III*

A satisfactory dental cream having superior antibacterial properties is prepared in the usual manner according to the following formulation:

| | Percent |
|---|---|
| Sodium N-lauroyl alpha-amino phenylacetate | 2.0 |
| Dicalcium phosphate dihydrate | 44.6 |
| Calcium carbonate | 5.0 |
| Glycerine | 29.4 |
| Water | 14.9 |
| Tetrasodium pyrophosphate | 1.0 |
| Irish moss gum | 0.75 | the balance consisting essentially of soluble saccharin, flavor and preservatives.

*Example IV*

A satisfactory tooth powder may be prepared similarly according to the following formulation:

| | Percent |
|---|---|
| Sodium N-lauroyl alpha-amino phenylacetate | 3.0 |
| Dicalcium phosphate dihydrate | 94.2 |
| Flavor | 2.5 |
| Soluble saccharin | 0.3 |

*Example V*

A satisfactory shampoo may be prepared similarly according to the following formulation:

| | Percent |
|---|---|
| Sodium N-lauroyl alpha-amino phenylacetate | 10 |
| Ethyl alcohol | 5 |
| Water | Balance |

Although the present invention has been described with reference to particular embodiments and examples, it will be apparent to those skilled in the art that variations and modifications of this invention can be made and the equivalents can be substituted thereto without departing from the principles and true spirit of the invention.

Having thus described the invention, what is claimed is:

1. An N-higher fatty acyl alpha-amino phenylacetic acid salt.

2. A water-soluble salt of an N-higher fatty acyl alpha-amino phenylacetic acid.

3. An alkali metal salt of an N-fatty acyl alpha-amino phenylacetic acid, said fatty acyl group having about 12 to 16 carbon atoms.

4. A water-soluble salt of N-lauroyl alpha-amino phenylacetic acid.

5. Sodium N-lauroyl alpha-amino phenylacetate.

6. An anti-bacterial composition comprising an N-fatty acyl alpha-amino phenylacetic acid salt, said fatty acyl group having about 12-16 carbon atoms, and a carrier.

7. An anti-bacterial composition comprising an alkali metal salt of N-lauroyl alpha-amino phenylacetic acid, and a carrier.

8. A dental preparation comprising a polishing agent and sodium N-lauroyl alpha-amino phenylacetate.

9. A new chemical compound selected from the group consisting of N-higher aliphatic acyl alpha amino mononuclear aryl acetic acid and its salts.

References Cited in the file of this patent

UNITED STATES PATENTS

| 2,063,987 | Dreyfus | Dec. 15, 1936 |
| 2,463,779 | Kester | Mar. 8, 1949 |
| 2,689,170 | King | Sept. 14, 1954 |
| 2,778,773 | Wellman | Jan. 22, 1957 |

OTHER REFERENCES

Beilstein, vol. 14, 1951, p. 287, 2nd suppl.